(12) United States Patent
Otosaka et al.

(10) Patent No.: US 11,855,500 B2
(45) Date of Patent: Dec. 26, 2023

(54) GENERATOR-MOTOR AND METHOD FOR MANUFACTURING GENERATOR-MOTOR

(71) Applicant: Mitsubishi Electric Corporation, Tokyo (JP)

(72) Inventors: Junka Otosaka, Tokyo (JP); Eigo Totoki, Tokyo (JP); Toshinori Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 394 days.

(21) Appl. No.: 17/423,913

(22) PCT Filed: Mar. 4, 2019

(86) PCT No.: PCT/JP2019/008421
§ 371 (c)(1),
(2) Date: Jul. 19, 2021

(87) PCT Pub. No.: WO2020/178953
PCT Pub. Date: Sep. 10, 2020

(65) Prior Publication Data
US 2022/0085678 A1 Mar. 17, 2022

(51) Int. Cl.
*H02K 3/28* (2006.01)
*H02K 15/00* (2006.01)
*H02K 21/16* (2006.01)

(52) U.S. Cl.
CPC .......... *H02K 3/28* (2013.01); *H02K 15/0081* (2013.01); *H02K 21/16* (2013.01)

(58) Field of Classification Search
CPC ...... H02K 3/28; H02K 15/0081; H02K 21/16; H02K 2213/03; H02K 3/18
(Continued)

(56) References Cited

U.S. PATENT DOCUMENTS 7,253,546 B2 * 8/2007 Fukuda .................. H02K 3/28
310/179
8,519,590 B2 * 8/2013 Baba ...................... H02K 3/28
310/156.01
(Continued)

FOREIGN PATENT DOCUMENTS

CN 101795026 A 8/2010
JP 8-308195 A 11/1996
(Continued)

OTHER PUBLICATIONS

International Search Report and Written Opinion dated May 21, 2019, received for PCT Application PCT/JP2019/008421, Filed on Mar. 4, 2019, 8 pages including English Translation.
(Continued)

*Primary Examiner* — John K Kim
(74) *Attorney, Agent, or Firm* — XSENSUS LLP

(57) ABSTRACT

When the number of teeth included in an in-phase teeth group is represented by T, a first half-slot adjacent to a k-th tooth is represented by A(k, 1), and a second half-slot adjacent to the k-th tooth is represented by A(k, 2), the number of turns of the coil arranged in A(1, 1) is the same as the number of turns of the coil arranged in A(T, 2), the number of turns of the coil arranged in A(1, 1) is different from the number of turns of the coil arranged in A(1, 2). The number of turns of the coil arranged in A(k, 2) is different from the number of turns of the coil arranged in A(k+1, 1), and the number of turns of the coils provided in the slot is twice the number of turns of the coil arranged in A(1, 1).

10 Claims, 15 Drawing Sheets

(58) Field of Classification Search
USPC .......................................................... 310/208
See application file for complete search history.

(56) References Cited

U.S. PATENT DOCUMENTS

| | | |
|---|---|---|
| 2002/0113517 A1 | 8/2002 | Takano |
| 2003/0011271 A1 | 1/2003 | Takano et al. |
| 2003/0122445 A1 | 7/2003 | Takano |
| 2004/0084605 A1 | 5/2004 | Yokoyama |
| 2005/0012421 A1* | 1/2005 | Fukuda .................. H02K 11/33 |
| | | 310/179 |
| 2005/0044692 A1 | 3/2005 | Takanoet et al. |
| 2020/0083772 A1 | 3/2020 | Sonoda |
| 2022/0085678 A1* | 3/2022 | Otosaka .................. H02K 3/18 |

FOREIGN PATENT DOCUMENTS

| | | |
|---|---|---|
| JP | 2000-253602 A | 9/2000 |
| JP | 2002-247789 A | 8/2002 |
| JP | 2002-325385 A | 11/2002 |
| JP | 2005-33924 A | 2/2005 |
| JP | 2018-198516 A | 12/2018 |

OTHER PUBLICATIONS

Chinese Office Action dated Apr. 18, 2023 in corresponding Chinese Patent Application No. 201980093286.3 (with machine-generated English translation), 13 pages.

* cited by examiner

1E

1E

GENERATOR-MOTOR AND METHOD FOR MANUFACTURING GENERATOR-MOTOR

CROSS-REFERENCE TO RELATED APPLICATION

The present application is based on PCT filing PCT/JP2019/008421, filed Mar. 4, 2019, the entire contents of which are incorporated herein by reference.

TECHNICAL FIELD

This invention relates to a generator-motor in which coils are wound around teeth, and a method of manufacturing the generator-motor.

BACKGROUND ART

In the related art, there is known an electric motor including a rotor core having a plurality of teeth, and having a slot formed between each adjacent pair of the teeth, a plurality of coils wound around the respective plurality of teeth to be arranged in a plurality of the slots, and connecting wires configured to connect each adjacent pair of the coils. The coils are wound in a concentrated manner. The connecting wires are provided on an anti-connection side which is opposite to a connection side with respect to the teeth, the connection side being a side on which the coils are connected. Coils of the same phase are wound consecutively around a plurality of teeth. The numbers of turns of coils wound around the respective plurality of teeth are each the same (see, for example, Patent Literature 1).

CITATION LIST

Patent Literature

[PTL 1] JP 2002-325385 A

SUMMARY OF INVENTION

Technical Problem

However, for a coil wound around a tooth arranged at an end portion in a circumferential direction of the plurality of teeth around which coils of the same phase are wound consecutively, the number of turns in a slot arranged outside in the circumferential direction with respect to the tooth is smaller than the number of turns in a slot arranged inside in the circumferential direction of the tooth. This causes a variation in numbers of turns of the coils in the slots. Therefore, there has been a problem in that a space factor of the coils in the slots is reduced.

This invention has been made to solve the above-mentioned problem, and therefore has an object to provide a generator-motor with which the space factor of coils in slots can be increased, and a method of manufacturing the generator-motor.

Solution to Problem

A generator-motor according to this invention includes: a core having a core back and a plurality of teeth provided side by side on the core back, and having a slot formed between each adjacent pair of the teeth; a plurality of coils wound around respective plurality of the teeth to be provided in each of a plurality of the slots; and one or more connecting wires configured to connect each adjacent pair of the coils, the coils being wound in a concentrated manner, at least one of the connecting wires being provided on an anti-connection side which is opposite to a connection side with respect to the teeth, the connection side being a side on which the coils are connected, of the plurality of teeth, a plurality of the teeth around which the coils of the same phase are wound and which are arrayed in line forming an in-phase teeth group, the number of teeth included in the in-phase teeth group being represented by T which is an integer of 2 or more, each of the slots being divided into two half-slots in an array direction which is one direction of directions in which the plurality of teeth are arrayed, one of the half-slots located in front in the array direction in the slot provided adjacent to, and at the back in the array direction of, one of the teeth being defined as a first half-slot, the other of the half-slots located at the back in the array direction in the slot provided adjacent to, and in front in the array direction of, the one of the teeth being defined as a second half-slot, when k is an integer of 1 or more, the first half-slot adjacent to a k-th tooth which is one of the teeth provided in a k-th place in the array direction is represented by $A(k, 1)$, and the second half-slot adjacent to the k-th tooth is represented by $A(k, 2)$, the number of turns of the coil arranged in $A(1, 1)$ being the same as the number of turns of the coil arranged in $A(T, 2)$, the number of turns of the coil arranged in $A(1, 1)$ being different from the number of turns of the coil arranged in $A(1, 2)$, when one of the connecting wires configured to connect the coil wound around the k-th tooth and the coil wound around a (k+1)-th tooth is provided on the anti-connection side, the number of turns of the coil arranged in $A(k, 2)$ being different from the number of turns of the coil arranged in $A(k+1, 1)$, the number of turns of the coils provided in the slot between each pair of the teeth which are included in the in-phase teeth group and which are adjacent to one another being twice the number of turns of the coil arranged in $A(1, 1)$.

Advantageous Effects of Invention

According to the generator-motor of this invention, the numbers of turns of the coils provided in the respective slots can be made equal to one another. As a result, the space factor of the coils in the slots can be increased.

DESCRIPTION OF EMBODIMENTS

First Embodiment

Figure 1:
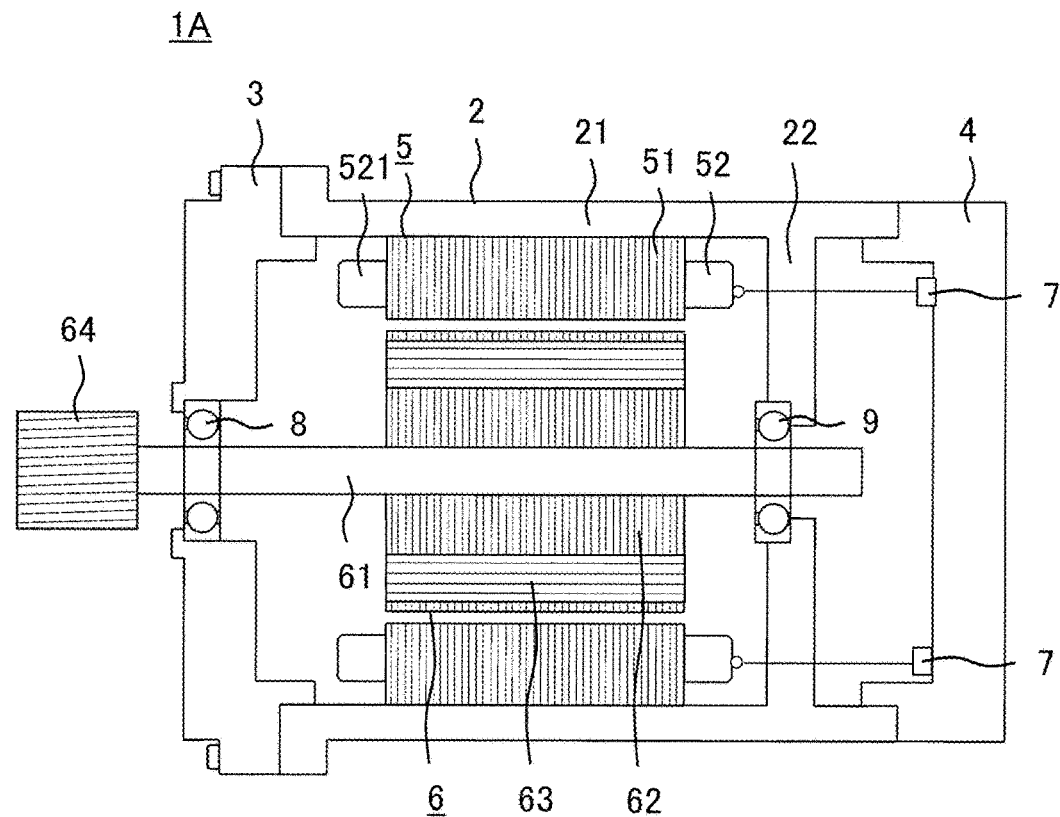
FIG. 1 is a longitudinal sectional view for illustrating an electric motor according to a first embodiment of this invention.

FIG. 1 is a longitudinal sectional view for illustrating an electric motor according to a first embodiment of this invention. As an example of a generator-motor, an electric motor 1A is described. In this example, an axial direction is an axial direction for the electric motor 1A, a radial direction is a radial direction for the electric motor 1A, and a circumferential direction is a circumferential direction for the electric motor 1A.

The electric motor 1A includes a frame 2, a first housing 3 provided at one end portion in the axial direction of the frame 2, and a second housing 4 provided at the other end portion in the axial direction of the frame 2. The frame 2 has a cylindrical frame main body 21, and a bottom plate portion 22 provided to the frame main body 21. The first housing 3 covers an opening portion of the frame 2. The second housing 4 is arranged to face the bottom plate portion 22 in the axial direction.

The electric motor 1A further includes a stator 5 fixed to an inner wall surface of the frame 2, a rotor 6 provided inside in the radial direction of the stator 5, and a plurality of connections 7 provided in the second housing 4 and connected to the stator 5. The electric motor 1A further includes a first bearing 8 provided in the first housing 3 to rotatably support the rotor 6, and a second bearing 9 provided in the bottom plate portion 22 of the frame 2 to rotatably support the rotor 6.

The stator 5 has a stator core 51, which is a core fixed to the frame 2, and a plurality of coils 52 fixed to the stator core 51. The coils 52 are wound in a concentrated manner. The stator core 51 is formed by laminating a plurality of core sheets made of a magnetic material. Portions of the coils 52 projecting in the axial direction from the stator core 51 are referred to as "coil ends 521".

The connections 7 are electrically connected to the coils 52. The connections 7 are arranged in the axial direction on the second housing 4 side with respect to the stator core 51. The second housing 4 side in the axial direction with respect to the stator core 51 is referred to as a "connection side". In contrast, the first housing 3 side in the axial direction with respect to the stator core 51 is referred to as an "anti-connection side". In other words, the anti-connection side is opposite to the connection side in the axial direction with respect to the stator core 51.

The rotor 6 has a shaft 61 supported by the first bearing 8 and the second bearing 9, a rotor core 62 fixed to the shaft 61, a plurality of permanent magnets 63 fixed to the rotor core 62, and a pulley 64 fixed to an end portion in the axial direction of the shaft 61. The permanent magnets 63 are affixed to an outer peripheral surface of the rotor core 62. The plurality of permanent magnets 63 are arranged side by side at regular intervals in the circumferential direction. Further, the rotor 6 has a cover (not shown) provided outside in the radial direction of the permanent magnets 63. The cover is formed into a cylindrical shape. The cover covers the permanent magnets 63 from outside in the radial direction. As a result, the permanent magnets 63 are prevented from flying from the rotor core 62 to the outside in the radial direction. The cover is made of a non-magnetic material, for example, stainless steel or aluminum.

An electric current is supplied from an external device to the coils 52 via the connections 7. To the coils 52, a three-phase AC current having U-phase, V-phase, and W-phase currents is supplied. As a result, the rotor 6 is rotated in the circumferential direction with respect to the stator 5.

Figure 2:
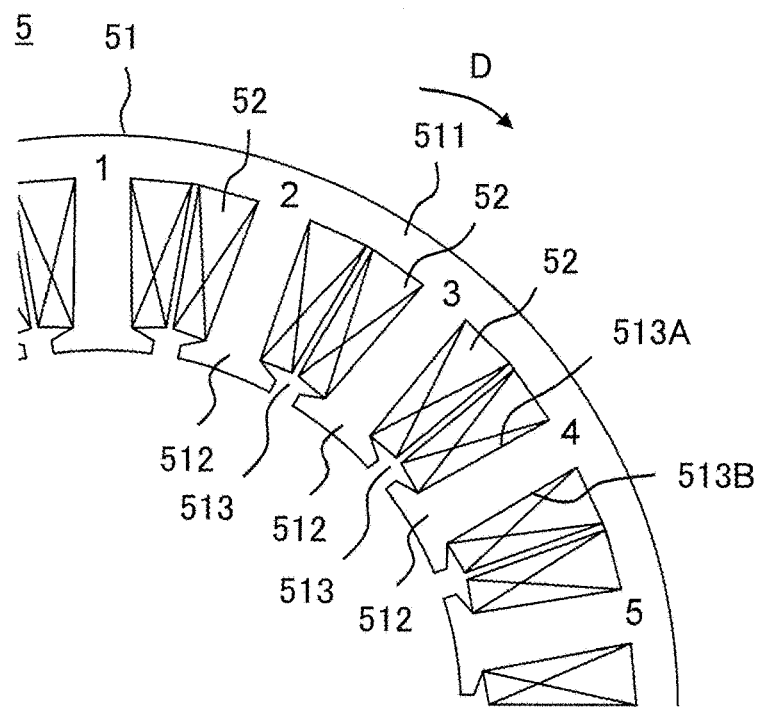
FIG. 2 is a longitudinal sectional view for illustrating a main part of a stator of FIG. 1.

FIG. 2 is a longitudinal sectional view for illustrating a main part of the stator 5 of FIG. 1. The stator core 51 has an annular core back 511, and a plurality of teeth 512 formed integrally with the core back 511. The teeth 512 are arranged inwardly in the radial direction from the core back 511. Further, the teeth 512 are arranged side by side in the circumferential direction. Between each adjacent pair of the teeth 512, a slot 513 is formed.

One direction of directions in which the teeth 512 are arranged is defined as an array direction D. In FIG. 2, a clockwise direction is defined as the array direction D. The slot 513 is divided into two half-slots in the array direction D. The half-slot located in front in the array direction D in the slot 513 provided adjacent to, and at the back in the array direction D of, one of the teeth 512 is defined as a first half-slot 513A. The half-slot located at the back in the array direction D in the slot 513 provided adjacent to, and in front in the array direction D of, the one of the teeth 512 is defined as a second half-slot 513B.

Figure 3:
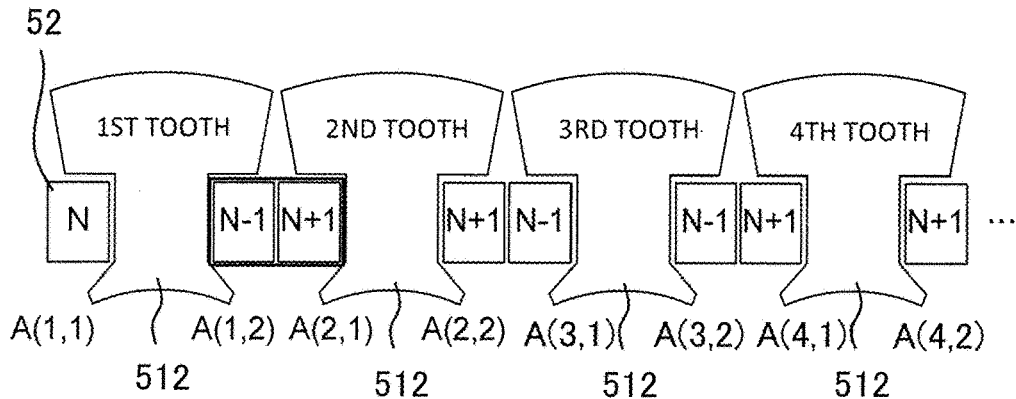
FIG. 3 is a schematic view for illustrating teeth and coils of FIG. 2.

FIG. 3 is a schematic view for illustrating the teeth 512 and the coils 52 of FIG. 2. Of the plurality of teeth 512, a plurality of teeth 512 around which the coils 52 of the same phase are wound and which are arrayed in line form an in-phase teeth group. The number of teeth 512 included in the in-phase teeth group is represented by T. The first half-slot 513A adjacent to a k-th tooth which is a tooth 512 provided in a k-th place in the array direction D is represented by A (k, 1). In contrast, the second half-slot 513B adjacent to the k-th tooth is represented by A(k, 2). It should be noted, however, that T is an integer of 2 or more, and k is an integer of 1 or more and T or less.

In this case, the first half-slot 513A adjacent to a 1st tooth is represented by A(1, 1), and the second half-slot 513B adjacent to the 1st tooth is represented by A(1, 2). The first half-slot 513A adjacent to a T-th tooth is represented by A(T, 1), and the second half-slot 513B adjacent to the T-th tooth is represented by A(T, 2).

Of the plurality of coils 52 wound around the in-phase teeth group, the coil 52 at the start of winding is first arranged in A(1, 1) and then wound around the 1st tooth. The numbers of turns of the coils 52 arranged in A(1, 1) to A(T, 2) are N, N−1, N+1, . . . , N+1, N−1, and N. It should be noted, however, that N is an integer of 2 or more. The number of turns of the coil 52 arranged in A(1, 1) is the same as the number of turns of the coil 52 arranged in A (T, 2). The numbers of turns of the coils 52 provided in a plurality of slots 513 among all the teeth 512 which are included in the in-phase teeth group and which are adjacent to one another are the same. Further, the number of turns of the coils 52 provided in the plurality of slots 513 among all the teeth 512 which are included in the in-phase teeth group and which are adjacent to one another is twice the number of turns of the coil 52 arranged in A(1, 1).

In other words, the number of turns of the coils 52 arranged in A(1, 1) and A(T, 2) is N, the number of turns of the coils 52 arranged in A(1, 2), A(2×n+1, 1), and A(2×n+1, 2) is N−1, and the number of turns of the coils 52 arranged in A(2, 1), A(2×n, 1), and A(2×n, 2) is N+1. It should be noted, however, that n is an integer of 1 or more, and a number with which the number of turns of the coils 52 arranged in A(2×n+1, 1), A(2×n+1, 2), A(2×n+1, 1), and A(2×n+1, 2) does not match the number of turns of the coil 52 arranged in A(T, 2).

In contrast, when the coil 52 at the start of winding is first arranged in A(1, 2) and then wound around the 1st tooth, the number of turns of the coils 52 arranged in A(1, 1) and A(T, 2) is N, the number of turns of the coils 52 arranged in A(1, 2), A(2×n+1, 1), and A(2×n+1, 2) is N+1, and the number of turns of the coils 52 arranged in A(2, 1), A(2×n, 1), and A(2×n, 2) is N−1.

Figure 4:
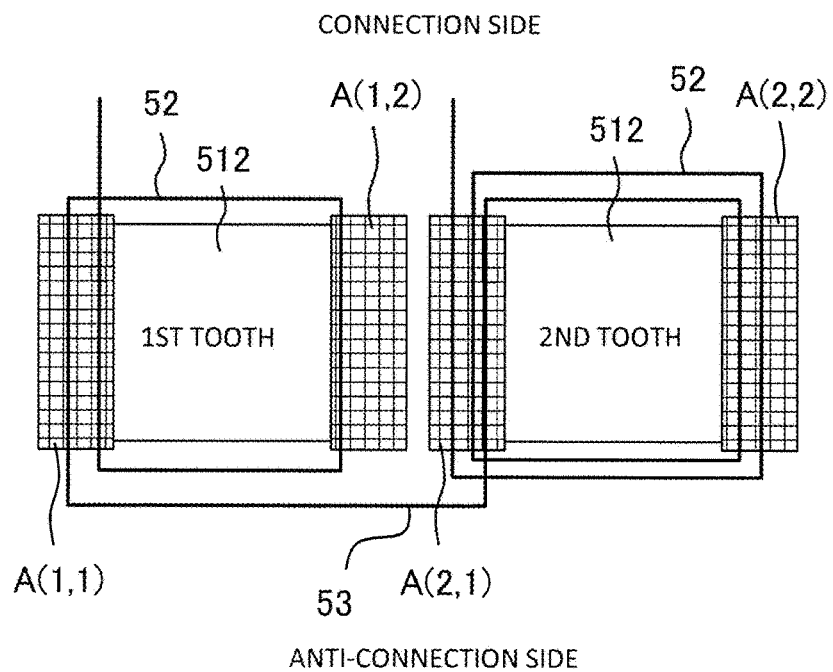
FIG. 4 is a view for illustrating a winding method for a case in which the number of consecutively wound coils is 2, a basic number of turns is 2, and a coil at the start of winding is first arranged in $A(1, 1)$ and then wound around a 1st tooth.

The number of consecutively wound coils which is the number of coils 52 around which the coils 52 are consecutively wound of the plurality of teeth 512 included in the in-phase teeth group is represented by E. A basic number of turns which is the number of turns as a basis of the coils 52 is represented by N. FIG. 4 is a view for illustrating a winding method for a case in which the number E of consecutively wound coils is 2, the basic number N of turns is 2, and the coil 52 at the start of winding is first arranged in A(1, 1) and then wound around the 1st tooth. The stator 5 has connecting wires 53 configured to connect each adjacent pair of the coils 52. In the case in which the number E of consecutively wound coils is 2, the basic number N of turns is 2, and the coil 52 at the start of winding is first arranged in A(1, 1) and then wound around the 1st tooth, numbers of turns of the coils 52 arranged in A(1, 1), A(1, 2), A(2, 1), and A(2,2) are 2, 1, 3, and 2, respectively.

Figure 5:
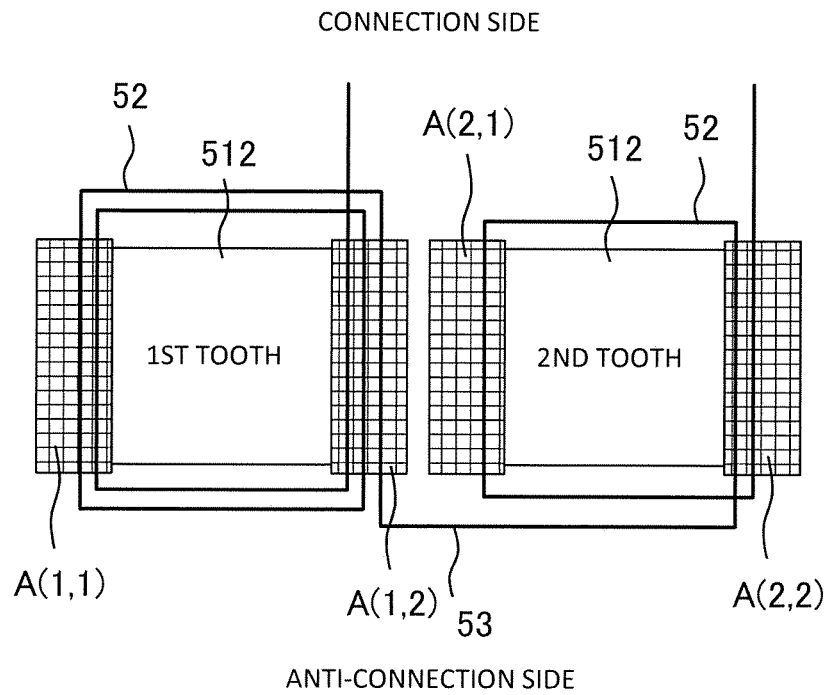
FIG. 5 is a view for illustrating a winding method for a case in which the number of consecutively wound coils is 2, the basic number of turns is 2, and the coil at the start of winding is first arranged in $A(1, 2)$ and then wound around the 1st tooth.

FIG. 5 is a view for illustrating a winding method for a case in which the number E of consecutively wound coils is 2, the basic number N of turns is 2, and the coil 52 at the start of winding is first arranged in A(1, 2) and then wound around the 1st tooth. In the case in which the number E of consecutively wound coils is 2, the basic number N of turns is 2, and the coil 52 at the start of winding is first arranged in A(1, 2) and then wound around the 1st tooth, numbers of turns of the coils 52 arranged in A(1, 1), A(1, 2), A(2, 1), and A(2,2) are 2, 3, 1, and 2, respectively.

Figure 6:
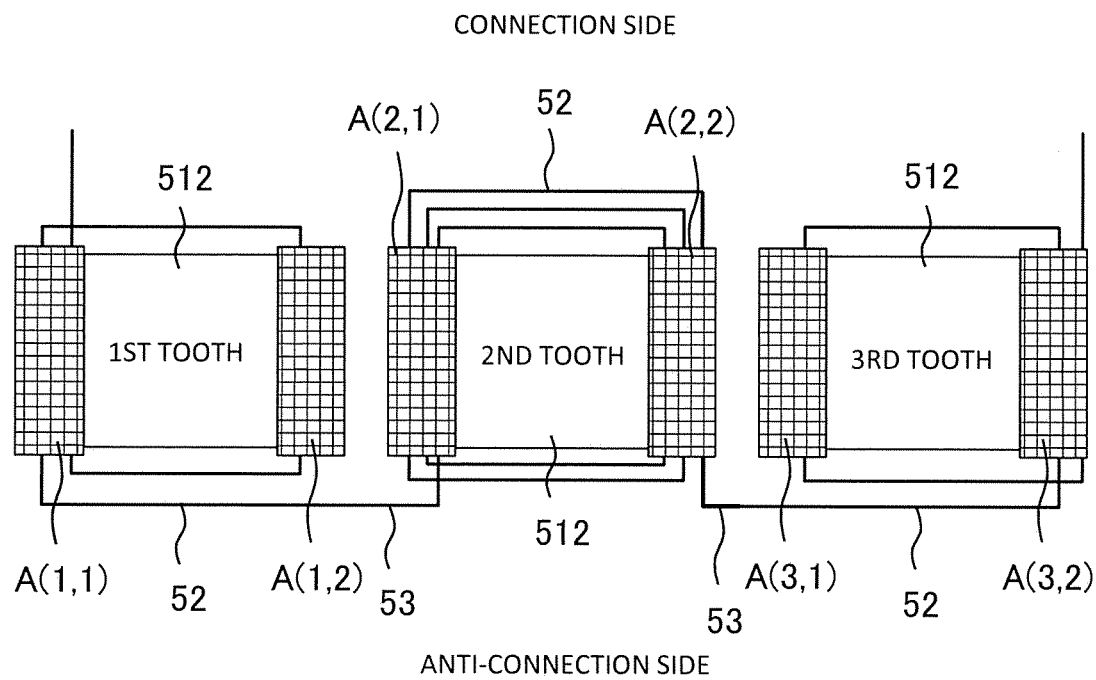
FIG. 6 is a view for illustrating a winding method for a case in which the number of consecutively wound coils is 3, the basic number of turns is 2, and the coil at the start of winding is first arranged in A(1, 1) and then wound around the 1st tooth.

FIG. 6 is a view for illustrating a winding method for a case in which the number E of consecutively wound coils is 3, the basic number N of turns is 2, and the coil 52 at the start of winding is first arranged in A(1, 1) and then wound around the 1st tooth. In the case in which the number E of consecutively wound coils is 3, the basic number N of turns is 2, and the coil 52 at the start of winding is first arranged in A(1, 1) and then wound around the 1st tooth, numbers of turns of the coils 52 arranged in A(1, 1), A(1, 2), A(2, 1), A(2, 2), A(3, 1), and A(3,2) are 2, 1, 3, 3, 1, and 2, respectively. Therefore, the total number of turns of the coils 52 arranged in A(1, 2) and A(2, 1) is 4. Further, the total number of turns of the coils 52 arranged in A(2, 2) and A(3, 1) is 4.

Figure 7:
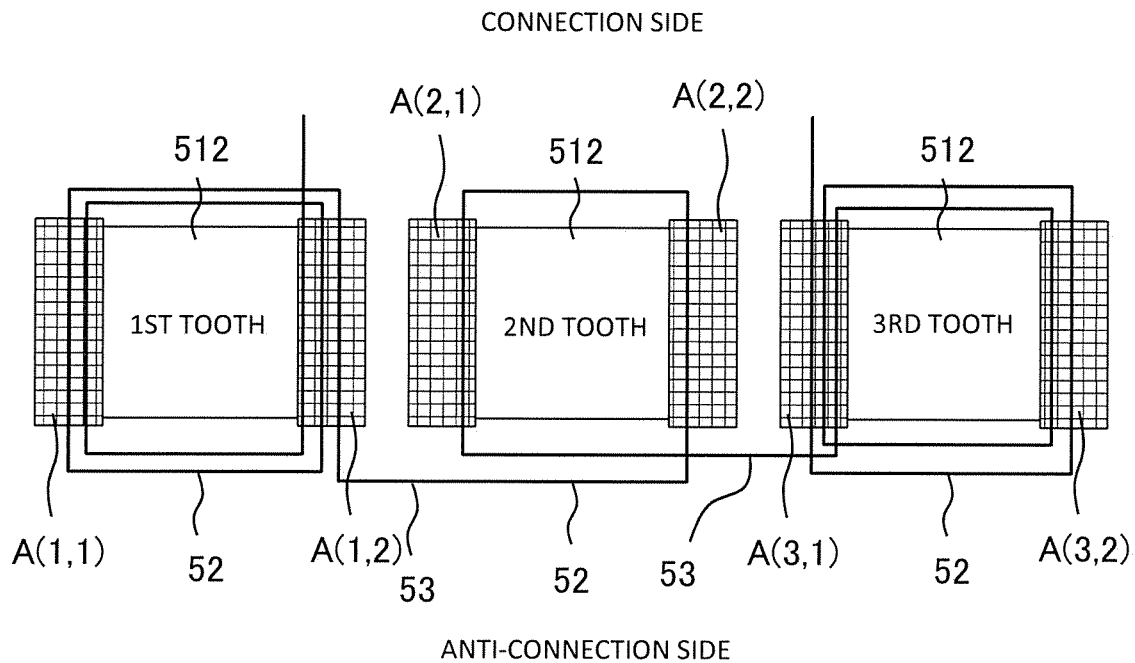
FIG. 7 is a view for illustrating a winding method for a case in which the number of consecutively wound coils is 3, the basic number of turns is 2, and the coil at the start of winding is first arranged in A(1, 2) and then wound around the 1st tooth.

FIG. 7 is a view for illustrating a winding method for a case in which the number E of consecutively wound coils is 3, the basic number N of turns is 2, and the coil 52 at the start of winding is first arranged in A(1, 2) and then wound around the 1st tooth. In the case in which the number E of consecutively wound coils is 3, the basic number N of turns is 2, and the coil 52 at the start of winding is first arranged in A(2, 1) and then wound around the 1st tooth, numbers of turns of the coils 52 arranged in A(1, 1), A(1, 2), A(2, 1), A(2, 2), A(3, 1), and A(3,2) are 2, 3, 1, 1, 3, and 2, respectively. Therefore, the total number of turns of the coils 52 arranged in A(1, 2) and A(2, 1) is 4. Further, the total number of turns of the coils 52 arranged in A(2, 2) and A(3, 1) is 4.

Also for other in-phase teeth groups adjacent to the in-phase teeth group in the circumferential direction, the number of turns of each of the coils 52 in A(1, 1) and A(T, 2) is 2. Therefore, in all of the plurality of slots, the number of turns of the coils 52 is 2.

Figure 8:
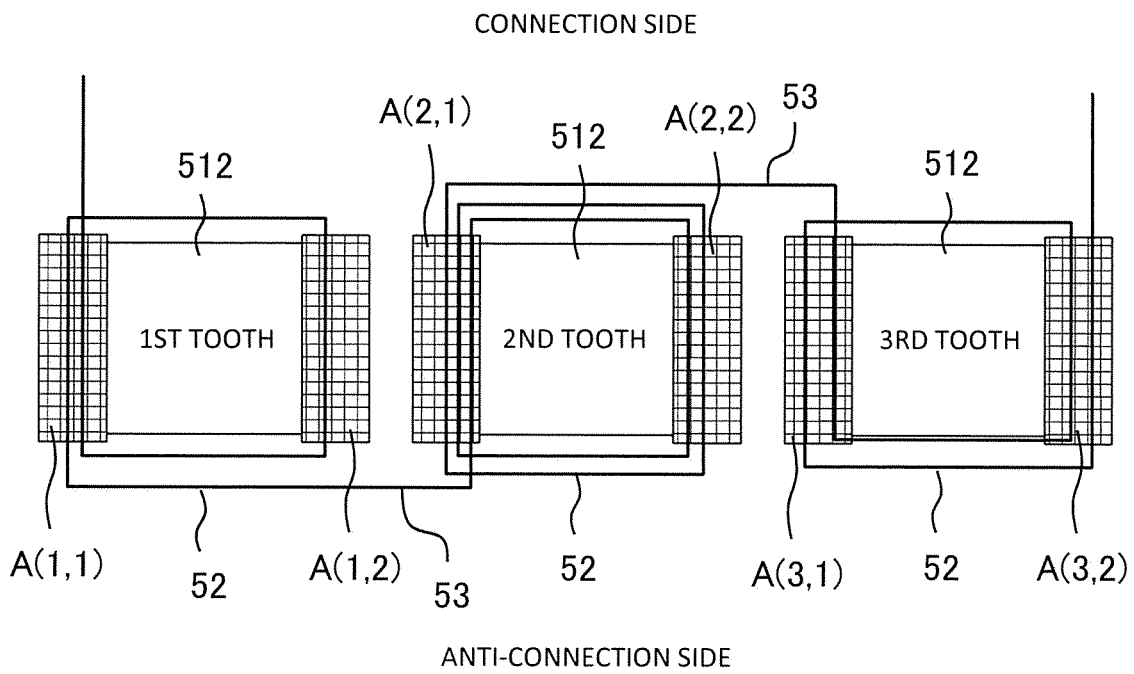
FIG. 8 is a view for illustrating a winding method for a case in which the number of consecutively wound coils is 3, the basic number of turns is 2, and the coil at the start of winding is first arranged in A(1, 1) and then wound around the 1st tooth, and in which one of two connecting wires is arranged on a connection side, and the other one of the two connecting wires is arranged in an anti-connection side.

FIG. 8 is a view for illustrating a winding method for a case in which the number E of consecutively wound coils is 3, the basic number N of turns is 2, and the coil 52 at the start of winding is first arranged in A(1, 1) and then wound around the 1st tooth, and in which one connecting wire 53 of two connecting wires 53 is arranged on the connection side, and the other connecting wire 53 is arranged on the anti-connection side. The connecting wire 53 arranged across the 1st tooth and a 2nd tooth is arranged on the anti-connection side. The connecting wire 53 arranged across the 2nd tooth and a 3rd tooth is arranged on the connection side. In this case, numbers of turns of the coils 52 arranged in A(1, 1), A(1, 2), A(2, 1), A(2, 2), A(3, 1), and A(3, 2) are 2, 1, 3, 2, 2, and 2, respectively. A configuration in which the number E of consecutively wound coils is 4, and the connecting wire 53 arranged across the 2nd tooth and the 3rd tooth is arranged on the connection side may be adopted instead. In other words, a configuration in which the number E of consecutively wound coils is T, and the connecting wire 53 arranged across the k-th tooth and a (k+1)-th tooth is arranged on the connection side may be adopted instead. It should be noted, however, that k is an integer that is larger than 2 and is smaller than T.

Figure 9:
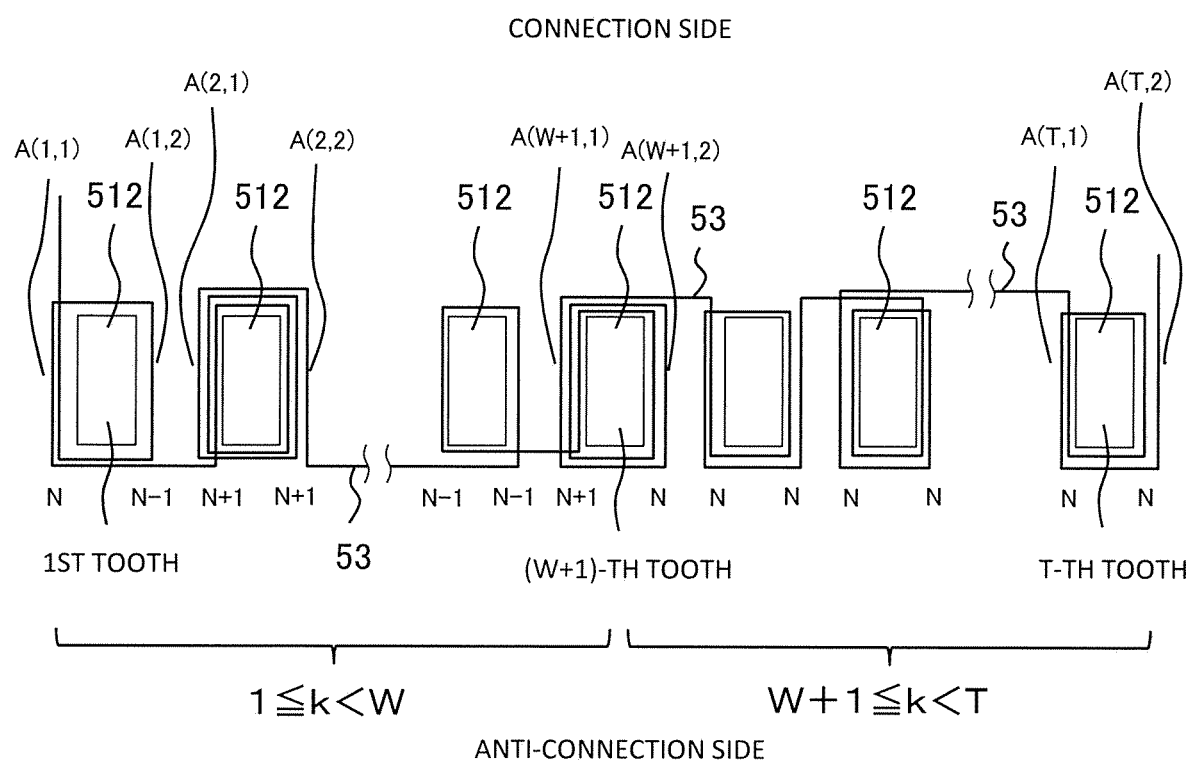
FIG. 9 is a view for illustrating a connection method for a case in which the number of consecutively wound coils is T, the basic number of turns is 2, and the coil at the start of winding is first arranged in A(1, 1) and then wound around the 1st tooth, and in which the number of connecting wires arranged on the anti-connection side is smaller than T−1.

FIG. 9 is a view for illustrating a connection method for a case in which the number E of consecutively wound coils is T, the basic number N of turns is 2, and the coil 52 at the start of winding is first arranged in A(1, 1) and then wound around the 1st tooth, and in which a number W of connecting wires 53 arranged on the anti-connection side is smaller than T−1. In FIG. 3, all the connecting wires 53 are arranged on the anti-connection side. In contrast, in FIG. 9, from the 1st tooth to a (W+1)-th tooth, the connecting wires 53 are arranged on the anti-connection side, and from (W+1)-th to T-th teeth, the connecting wires 53 are arranged on the connection side.

The total number of turns of the coils 52 arranged in the plurality of slots 513 in the case in which the connecting wires 53 are arranged on the anti-connection side is a number that can be divided evenly by the number of the plurality of slots 513 in the case in which the connecting wires 53 are arranged on the anti-connection side. In other words, the total number of turns of the coils 52 arranged in the plurality of slots 513 in the case in which the connecting wires 53 are arranged on the anti-connection side is a number that is an integer multiple of the number of the plurality of slots 513 in the case in which the connecting wires 53 are arranged on the anti-connection side.

In the axial direction, a dimension from one coil end 521 or connecting wire 53 to the other coil end 521 or connecting wire 53 is defined as a length in a direction of the axis of the stator. Through a reduction in length in the direction of the axis of the stator, the electric motor 1A can be downsized.

Figure 10:
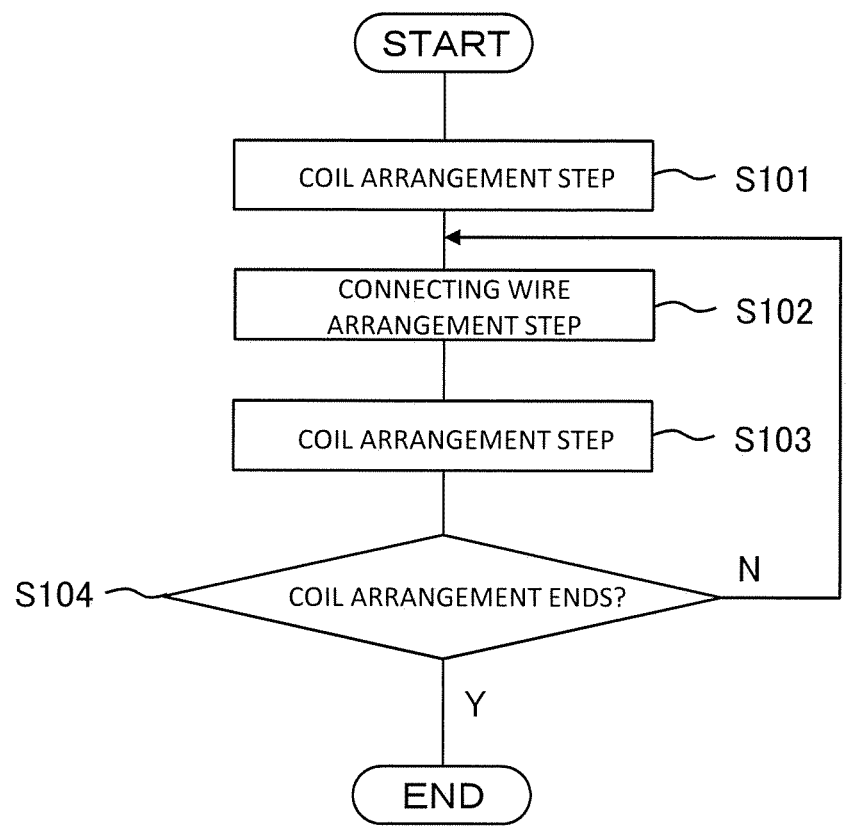
FIG. 10 is a flow chart for illustrating a procedure of winding the coils around the teeth of the electric motor of FIG. 1 to arrange the coils in slots.

Next, an electric motor manufacturing method of manufacturing the electric motor 1A is described. FIG. 10 is a flow chart for illustrating a procedure of winding the coils 52 around the teeth 512 of the electric motor 1A of FIG. 1 to arrange the coils 52 in the slots 513. First, in Step S101, a coil arrangement step is performed. In the coil arrangement step, the coil 52 at the start of winding is wound around a tooth 512 to arrange the coil 52 in corresponding slots 513.

After that, in Step S102, a connecting wire arrangement step is performed. In the connecting wire arrangement step, the connecting wire 53 is arranged from the tooth 512 around which the coil 52 is wound in Step S1 to a tooth 512 adjacent to the tooth 512. As a result, the coil 52 arranged in Step S101 and the connecting wire 53 arranged in Step S102 are connected to each other. In the connecting wire arrangement step, at least one connecting wire 53 is provided on the anti-connection side.

After that, in Step S103, a coil arrangement step is performed. In the coil arrangement step, a coil 52 is wound around the tooth 512 adjacent to the tooth 512 around which the coil 52 is wound in Step S1 to arrange the coil 52 in corresponding slots 513. As a result, the coil 52 arranged in Step S101 and the coil 52 arranged in Step S103 are connected to each other through the connecting wires 53.

After that, in Step S104, a coil arrangement end determination step is performed. In the coil arrangement end determination step, it is determined whether the coils 52 are wound around all the teeth 512. When it is determined in Step S104 that there is a tooth 512 around which a coil 52 is yet to be wound, the procedure returns to Step S102. In contrast, when it is determined in Step S104 that the coils 52 are wound around all the teeth 512, the procedure of winding the coils 52 around the teeth 512 to arrange the coils 52 in the slots 513 is ended.

As described above, according to the electric motor 1A of the first embodiment of this invention, the number of turns of the coil arranged in A(1, 1) is the same as the number of turns of the coil 52 arranged in A(T, 2). The number of turns of the coils 52 provided in the slots 513 among the teeth 512 which are included in the in-phase teeth group and which are adjacent to each other is twice the number of turns of the coil 52 arranged in A(1, 1). As a result, the numbers of turns of the coils 52 arranged in the slots 513 can be made equal to one another. As a result, a space factor of the coils 52 in the slots 513 can be increased. Therefore, a copper loss of the coils 52 can be reduced. As a result, efficiency of the electric motor 1A can be increased. Further, a dimension of the stator core 51 in the axial direction can be reduced. As a result, the electric motor 1A can be downsized.

Further, the connecting wires 53 are arranged on the anti-connection side. For example, when the connecting wires 53 are arranged on the connection side, a shape of an insulator arranged between the coil 52 and the tooth 512 becomes complicated. Specifically, notches for passing the connecting wires 53 and claws for holding the connections 7 are required to be formed on the connection side of the insulator. Through the arrangement of the connecting wires 53 on the anti-connection side, only the claws for holding the connections are formed on the connection side of the insulator, and the notches for passing the connecting wires 53 can be formed on the anti-connection side of the insulator.

Further, of the plurality of coils 52 wound around the in-phase teeth group, the coil 52 at the start of winding is first arranged in the first half-slot 513A or the second half-slot 513B adjacent to the 1st tooth and then wound around the 1st tooth. As a result, the coil 52 at the start of winding can be wound easily. In the case in which the coil 52 at the start of winding is first arranged in the first half-slot 513A, as compared to the case in which the coil 52 at the start of winding is first arranged in the second half-slot 513B, the connecting wires 53 can be prevented from crossing each other. As a result, the connecting wires 53 are prevented from causing a short therebetween. The connecting wires may also be prevented from crossing each other through arrangement of some of the connecting wires 53 on the connection side as illustrated in FIG. 8.

Further, the manufacturing method of the electric motor 1A according to the first embodiment of this invention includes: the coil arrangement step of winding the coils 52 around the respective plurality of teeth 512 included in the in-phase teeth group to provide the coils 52 in each of the plurality of slots 513; and the connecting wire arrangement step of providing at least one of the connecting wires 53 on the anti-connection side. As a result, the numbers of turns of the coils 52 arranged in the slots 513 can be made equal to one another. As a result, the space factor of the coils 52 in the slots 513 can be increased.

In the first embodiment described above, the coils 52 of one phase has been described, but this invention is not limited thereto. One of the connecting wires 53 configured to connect the coils 52 in the in-phase teeth group of a U-phase is defined as a U-phase connecting wire, another one of the connecting wires 53 configured to connect the coils 52 in the in-phase teeth group of a V-phase is defined as a V-phase connecting wire, and the other one of the connecting wires 53 configured to connect the coils 52 in the in-phase teeth group of a W-phase is defined as a W-phase connecting wire. In this case, a configuration in which one or two of the U-phase connecting wire, the V-phase connecting wire, and the W-phase connecting wire are provided on the anti-connection side, and the others are provided on the connection side may be adopted instead. In this case, the connecting wires 53 can be arranged in portions of empty space on the connection side and the anti-connection side. As a result, the dimension of the electric motor 1A in the axial direction can be reduced.

Further, in the first embodiment described above, the number of slots has been generalized for description. However, this invention is not limited thereto. It is only required that a configuration in which, when the number E of consecutively wound coils is 2 or more, the number of slots per pole per number is larger than ¼ and is smaller than ⅜ be adopted.

Further, it is only required that the number of connecting wires 53 be at least 1 or more. Still further, it is only required that at least one connecting wire 53 be provided on the anti-connection side with respect to the teeth 512.

Second Embodiment

Figure 11:
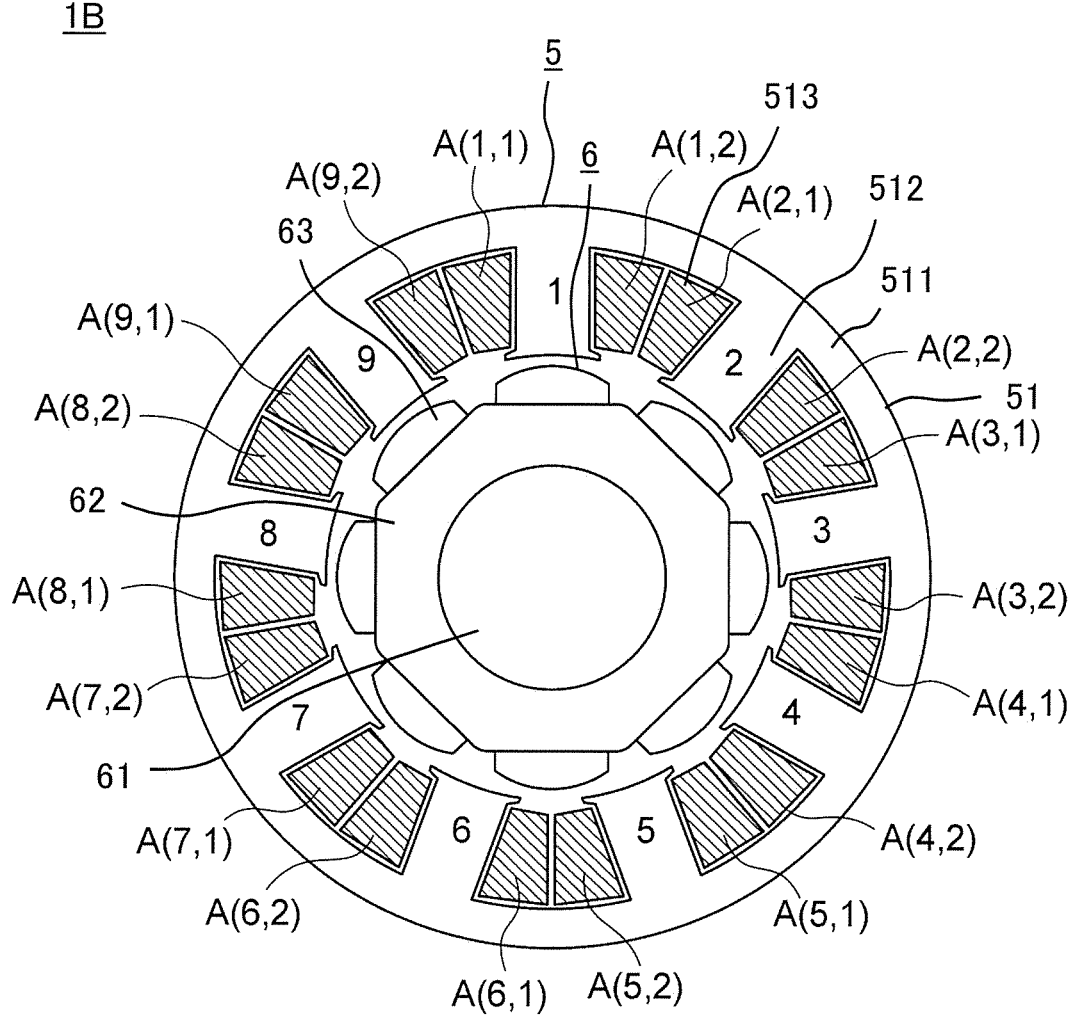
FIG. 11 is a longitudinal sectional view for illustrating an electric motor according to a second embodiment of this invention.

FIG. 11 is a longitudinal sectional view for illustrating an electric motor according to a second embodiment of this invention. In an electric motor 1B, the rotor 6 has eight permanent magnets 63. The stator core 51 has nine teeth 512. Therefore, in the electric motor 1B, the number of poles is 8, and the number of slots 513 is 9.

From a 1st tooth to a 3rd tooth, U-phase coils 52 are wound. From a 4th tooth to a 6th tooth, V-phase coils 52 are wound. From a 7th tooth to a 9th tooth, W-phase coils 52 are wound. The other configuration is the same as in the first embodiment.

Figure 12:
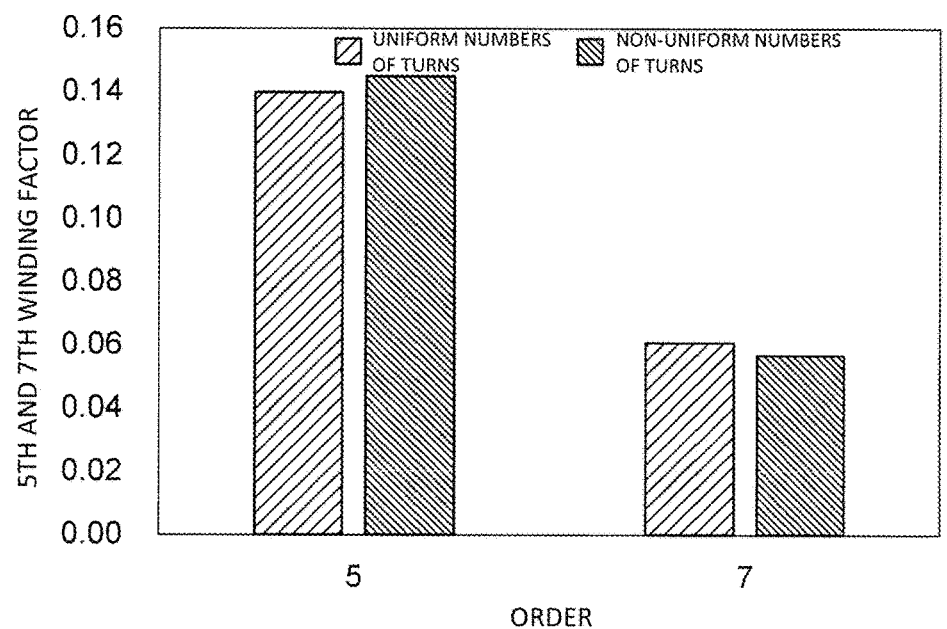
FIG. 12 is a graph for showing a winding factor in the electric motor of FIG. 11.

FIG. 12 is a graph for showing a winding factor in the electric motor 1B of FIG. 11. In FIG. 12, a 5th harmonic wave and a 7th harmonic wave in the winding factor are shown. Further, FIG. 12 shows a case in which numbers of turns of the coils 52 arranged in the slots 513 are the same, that is, the numbers of turns are uniform, and a case in which the numbers of turns of the coils 52 arranged in the slots 513 are different from one another, that is, the numbers of turns are not uniform. In the case in which the numbers of turns are uniform, as compared to the case in which the numbers of turns are not uniform, the 5th harmonic wave of the winding factor becomes smaller. In the case in which the numbers of turns are uniform, as compared to the case in which the numbers of turns are not uniform, the 7th harmonic wave of the winding factor becomes larger. However, through a change in shape of the permanent magnets 63, the 7th harmonic wave of the winding factor can be reduced.

Generally, in the electric motor 1B, a 6$f$ component of torque ripple poses a problem. The 6$f$ component of torque ripple is caused by the 5th harmonic wave and the 7th harmonic wave of the winding factor. Therefore, through the reductions in the 5th harmonic wave and the 7th harmonic wave of the winding factor, the 6$f$ of torque ripple can be reduced.

As described above, according to the electric motor 1B of the second embodiment of this invention, the number of poles is 8, and the number of slots is 9. In this case, the 6$f$ of torque ripple can be reduced. Further, a loss caused by harmonic components of the winding factor, for example, the copper loss of the coils 52 can be reduced. As a result, efficiency of the electric motor 1B can be increased. Still further, as in the first embodiment, the numbers of turns of the coils 52 arranged in the slots 513 can be made equal to one another. As a result, a change in torque characteristic of the electric motor 1B caused when a rotation direction of the rotor 6 is changed can be suppressed.

Figure 13:
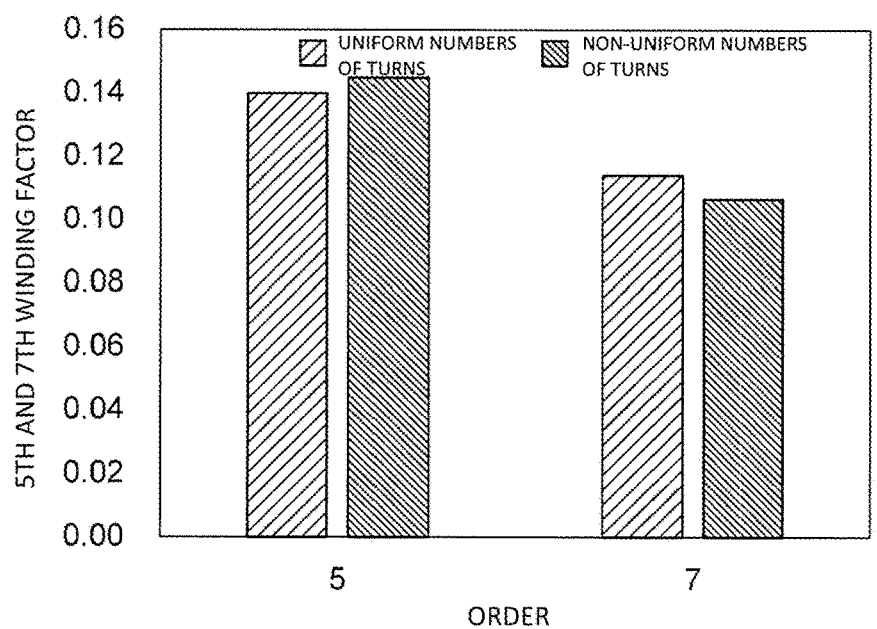
FIG. 13 is a graph for showing a winding factor in the electric motor in a case in which the number of poles is 10 and the number of slots is 9.
Figure 14:
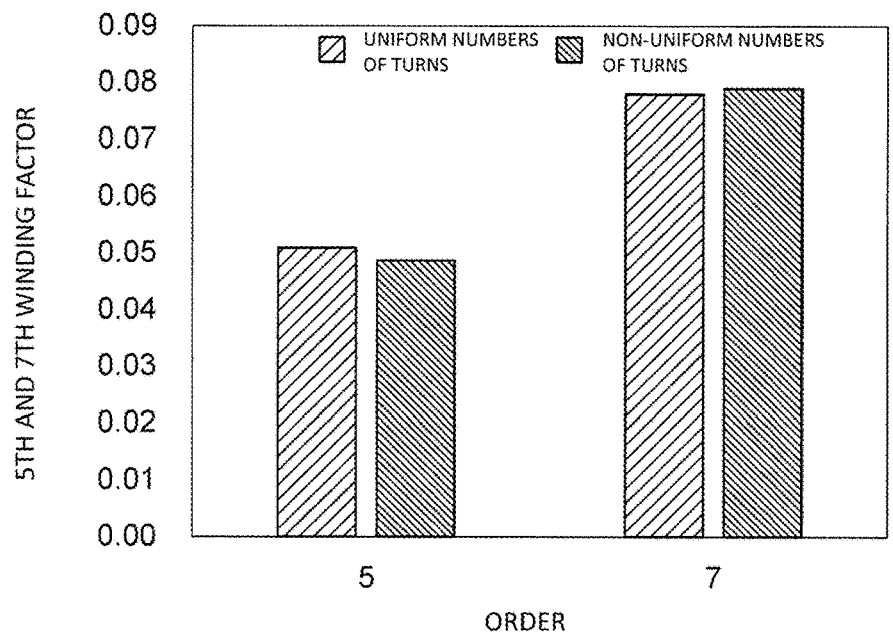
FIG. 14 is a graph for showing a winding factor in the electric motor in a case in which the number of poles is 14 and the number of slots is 18.
Figure 15:
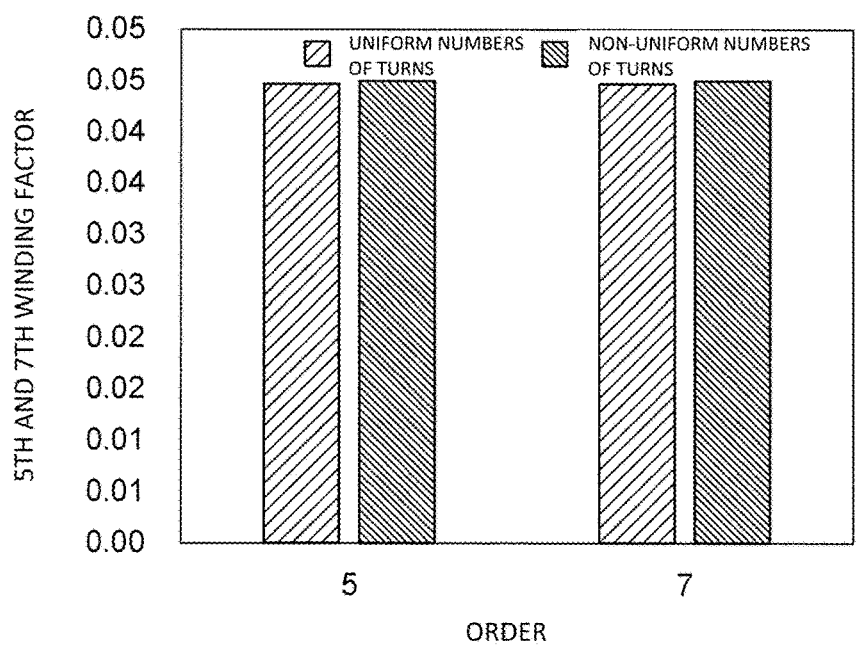
FIG. 15 is a graph for showing a winding factor in the electric motor in a case in which the number of poles is 14 and the number of slots is 12.

In the second embodiment described above, the electric motor 1B in which the number of poles is 8 and the number of slots 513 is 9, in other words, a ratio of the number of poles to the number of slots 513 is 8:9 has been described. However, for example, the number of poles may be 10 and the number of slots 513 may be 9, the number of poles may be 14 and the number of slots may be 18, or the number of poles may be 14 and the number of slots may be 12. In other words, the ratio of the number of poles to the number of slots 513 may be 10:9, 7:9, or 7:6. FIG. 13 is a graph for showing a winding factor in the electric motor in the case in which the number of poles is 10 and the number of slots 513 is 9. FIG. 14 is a graph for showing a winding factor in the electric motor in the case in which the number of poles is 14 and the number of slots 513 is 18. FIG. 15 is a graph for showing a winding factor in the electric motor in the case in which the number of poles is 14 and the number of slots 513 is 12. Even in the case in which the number of poles is 10 and the number of slots 513 is 9, effects similar to those obtained by the second embodiment can be obtained. In the case in which the number of poles is 14 and the number of slots 513 is 18, and in the case in which the numbers of turns are uniform, as compared to the case in which the numbers of turns are not uniform, the 7th harmonic wave of the winding factor becomes smaller, and the 5th harmonic wave of the winding factor becomes larger. However, through a change in shape of the permanent magnets 63, the 5th harmonic wave of the winding factor can be reduced. In the case in which the number of poles is 14 and the number of slots 513 is 12, and in the case in which the numbers of turns are uniform, as compared to the case in which the numbers of turns are not uniform, the 5th harmonic wave and the 7th harmonic wave of the winding factor can be reduced. Further, the winding factor may be an integer multiple of the number of poles and the number of slots 513 of 8:9, an integer multiple of 10:9, an integer multiple of 14:18, or an integer multiple of 14:12.

Third Embodiment

Figure 16:
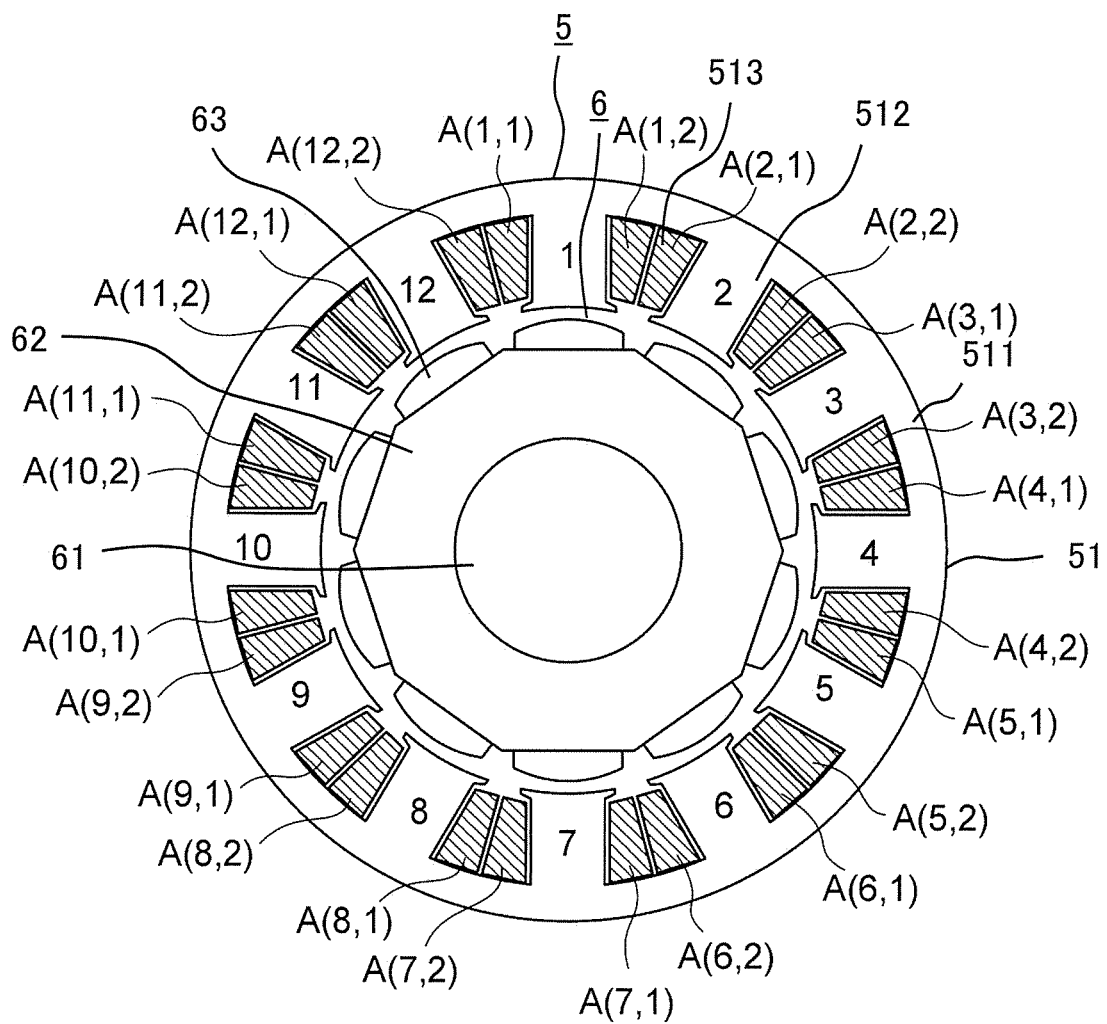
FIG. 16 is a longitudinal sectional view for illustrating an electric motor according to a third embodiment of this invention.

FIG. 16 is a longitudinal sectional view for illustrating an electric motor according to a third embodiment of this invention. In an electric motor 1C, the rotor 6 has ten permanent magnets 63. The stator core 51 has twelve teeth 512. Therefore, in the electric motor 1C, the number of poles is 10, and the number of slots 513 is 12. In other words, the ratio of the number of poles to the number of slots is 5:6.

Around the 1st tooth and the 2nd tooth, the U-phase coils 52 are wound. Around the 3rd tooth and the 4th tooth, the V-phase coils 52 are wound. Around the 5th tooth and the 6th tooth, the W-phase coils 52 are wound. Around the 7th tooth and the 8th tooth, the U-phase coils 52 are wound. Around the 9th tooth and the 10th tooth, the V-phase coils 52 are wound. Around the 11th tooth and the 12th tooth, the W-phase coils 52 are wound.

As in the first embodiment, when the coil 52 at the start of winding is first arranged in A(1, 1), as illustrated in FIG.

6, numbers of turns of the coils 52 in A(1, 1), A(1, 2), A(2, 1), A(2,2), A(3, 1), and A(3, 2) are 2, 1, 3, 3, 1, and 2, respectively. Further, as in the first embodiment, when the coil 52 at the start of winding is first arranged in A(1, 2), as illustrated in FIG. 7, numbers of turns of the coils 52 in A(1, 1), A(1, 2), A(2, 1), A(2,2), A(3, 1), and A(3, 2) are 2, 3, 1, 1, 3, and 2, respectively. The other configuration is the same as in the first embodiment.

As described above, according to the third embodiment of this invention, the number of poles is 10, and the number of slots 513 is 12. As in the first embodiment, the numbers of turns of the coils 52 arranged in the slots 513 can be made equal to one another. As a result, a change in torque characteristic of the electric motor 1C caused when the rotation direction of the rotor 6 is changed can be suppressed.

Further, the number of connecting wires 53 is an odd number. As a result, as compared to a case in which the number of connecting wires 53 is an even number, the connecting wires 53 can be formed of short lead wires.

Fourth Embodiment

Figure 17:
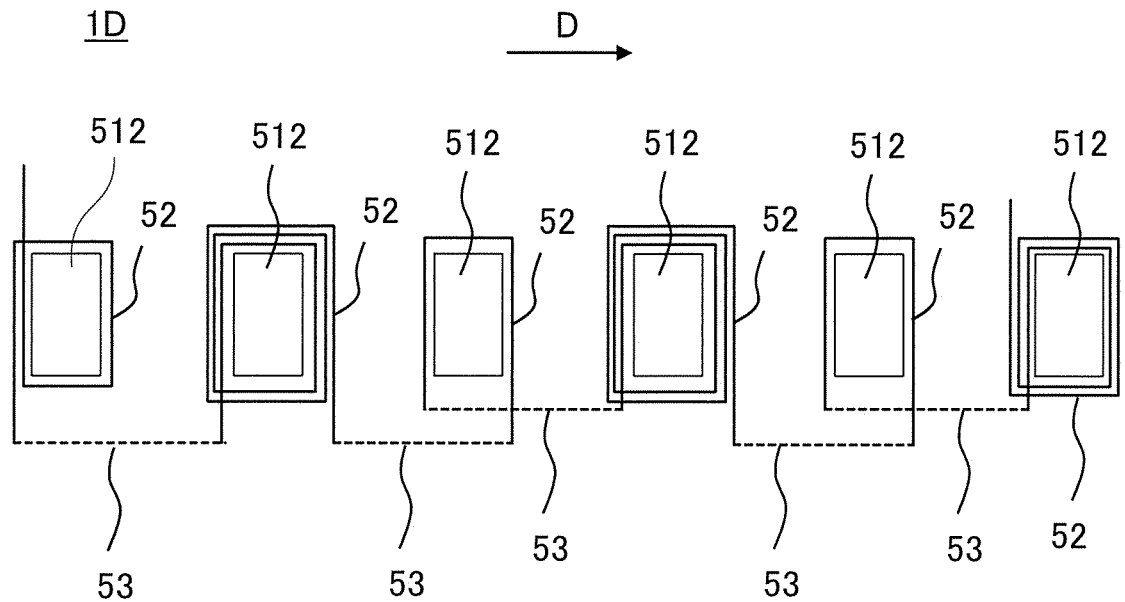
FIG. 17 is a schematic view for illustrating teeth and coils in an electric motor according to a fourth embodiment of this invention.

FIG. 17 is a schematic view for illustrating teeth and coils in an electric motor according to a fourth embodiment of this invention. In an electric motor 1D, six teeth 512 are arrayed in line in the array direction D. The connecting wire 53 arranged between a 1st tooth and a 2nd tooth is defined as a 1st connecting wire. The connecting wire 53 arranged between the 2nd tooth and a 3rd tooth is defined as a 2nd connecting wire. The connecting wire 53 arranged between the 3rd tooth and a 4th tooth is defined as a 3rd connecting wire. The connecting wire 53 arranged between the 4th tooth and a 5th tooth is defined as a 4th connecting wire. The connecting wire 53 arranged between the 5th tooth and a 6th tooth is defined as a 5th connecting wire.

Figure 18:
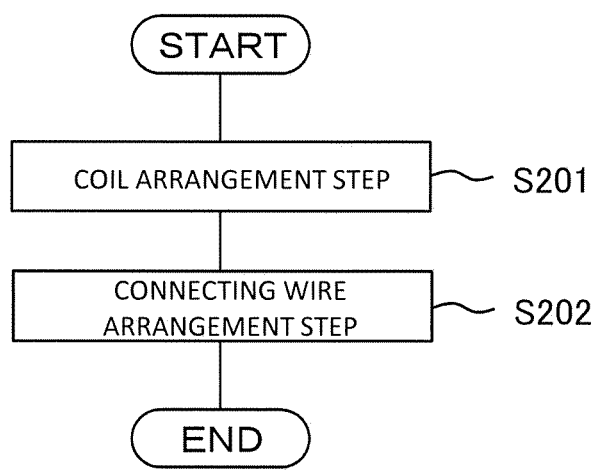
FIG. 18 is a flowchart for illustrating a procedure of winding the coils around the teeth of FIG. 17 to arrange the coils in the slots.

Next, an electric motor manufacturing method of manufacturing the electric motor 1D is described. FIG. 18 is a flow chart for illustrating a procedure of winding the coils 52 around the teeth 512 of FIG. 17 to arrange the coils 52 in the slots 513. First, in Step S201, a coil arrangement step is performed. In the coil arrangement step, from the 1st tooth to the 6th tooth, the coils 52 are wound separately to arrange the coils 52 in corresponding slots 513.

After that, in Step S202, a connecting wire arrangement step is performed. In the connecting wire arrangement step, from the 1st connecting wire to the 5th connecting wire, adjacent pairs of the teeth 512 are connected separately. In the connecting wire arrangement step, at least one connecting wire 53 is arranged on the anti-connection side.

As described above, according to the manufacturing method of the electric motor 1D of the fourth embodiment of this invention, the coil arrangement step includes winding each of the plurality of coils 52 one at a time around the teeth 512, and the connecting wire arrangement step is performed after the coil arrangement step. As a result, the coil arrangement step can be performed easily.

Figure 19:
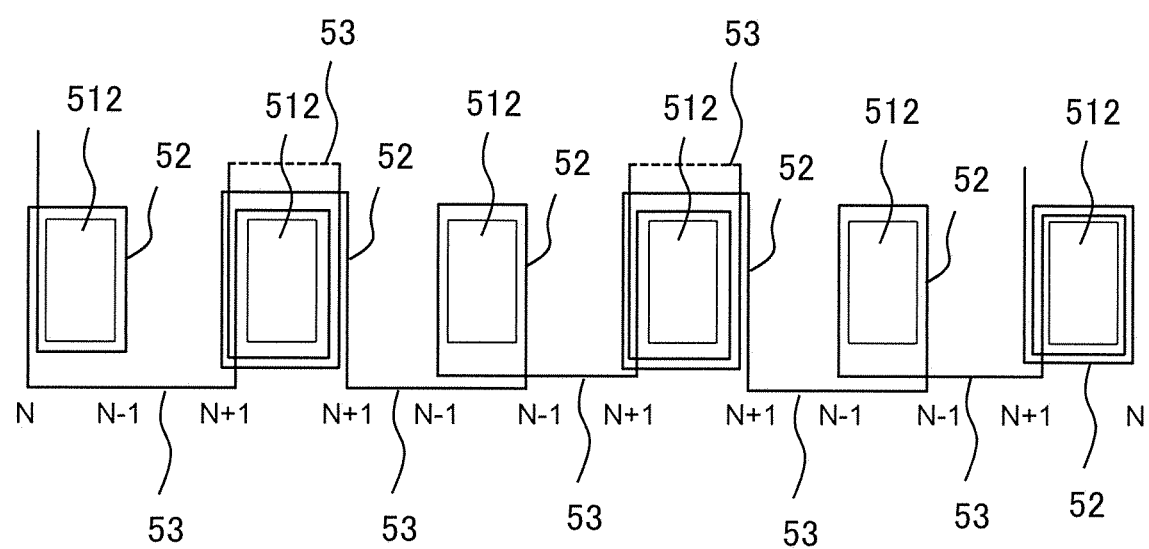
FIG. 19 is a schematic view for illustrating a modification example of the electric motor of FIG. 17.

In the fourth embodiment described above, in the coil arrangement step, there has been described the configuration in which each of the plurality of coils 52 is wound one at a time around the teeth 512. However, as illustrated in FIG. 19, a configuration in which the coil arrangement step includes winding the coils 52 consecutively around the plurality of teeth 512 which form a part of the in-phase teeth group and which are adjacent to one another may be adopted instead. In this case, the connecting wire arrangement step includes: a first connecting wire step of providing, in the middle of winding the coils 52 consecutively around the plurality of teeth 512, lead wires continuous to the already-wound coils 52 as the connecting wires 53; and a second connecting wire step of providing, after winding the coils 52 consecutively around the plurality of teeth 512, lead wires different from the already-wound coils 52 as the connecting wires 53.

Fifth Embodiment

Figure 20:
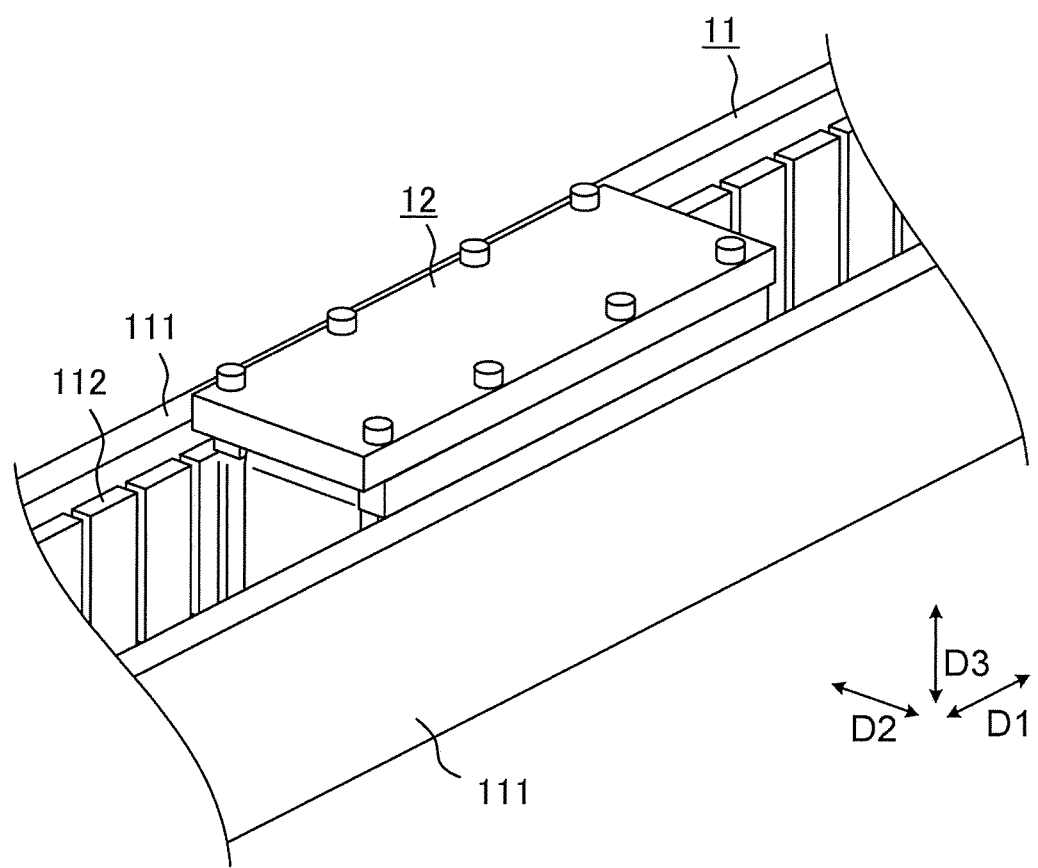
FIG. 20 is a perspective view for illustrating an electric motor according to a fifth embodiment of this invention.

FIG. 20 is a perspective view for illustrating an electric motor according to a fifth embodiment of this invention. As an example of a generator-motor, a linear electric motor 1E is described. The linear electric motor 1E includes a field magneton 11 serving as a stator, and an armature 12 serving as a mover. The field magneton 11 is arranged to extend in a first direction D1. A width direction of the field magneton 11 as seen in the first direction D1 is defined as a second direction D2. A height direction of the field magneton 11 as seen in the first direction D1 is defined as a third direction D3.

The armature 12 is configured to move in the first direction D1 with respect to the field magneton 11 using a thrust generated between the field magneton 11 and the armature 12.

Thrust generating surfaces of the linear electric motor 1E are formed on both sides of the armature 12 in the second direction D2. In other words, the linear electric motor 1E is a bilateral electric motor. On the armature 12, an object to be conveyed (not shown) is supported. The linear electric motor 1E conveys the object to be conveyed by the armature 12 moving with respect to the field magneton 11 with the armature 12 supporting the object to be conveyed. The object to be conveyed corresponds to a movable portion of a mechanical device. Further, the object to be conveyed corresponds to a head of assembly equipment, a carriage on which a luggage is loaded, or a stage on which a luggage is loaded.

The field magneton 11 has a pair of field yokes 111, and a plurality of permanent magnets 112 fixed to each of the pair of field yokes 111. The pair of field yokes 111 are arranged at an interval in the second direction D2. The field yokes 111 are formed to extend in the first direction D1. The pair of field yokes 111 are arranged parallel to each other. The plurality of permanent magnets 112 are fixed to surfaces facing each other of the pair of field yokes 111. The plurality of permanent magnets 112 are arrayed in line at equal pitches in the first direction D1 for each of the field yokes 111. Therefore, the plurality of permanent magnets 112 are arranged in two lines at an interval in the second direction D2. Polarities of the permanent magnets 112 are arranged so that the permanent magnets 112 adjacent to each other in the first direction D1 have opposite polarities.

Figure 21:
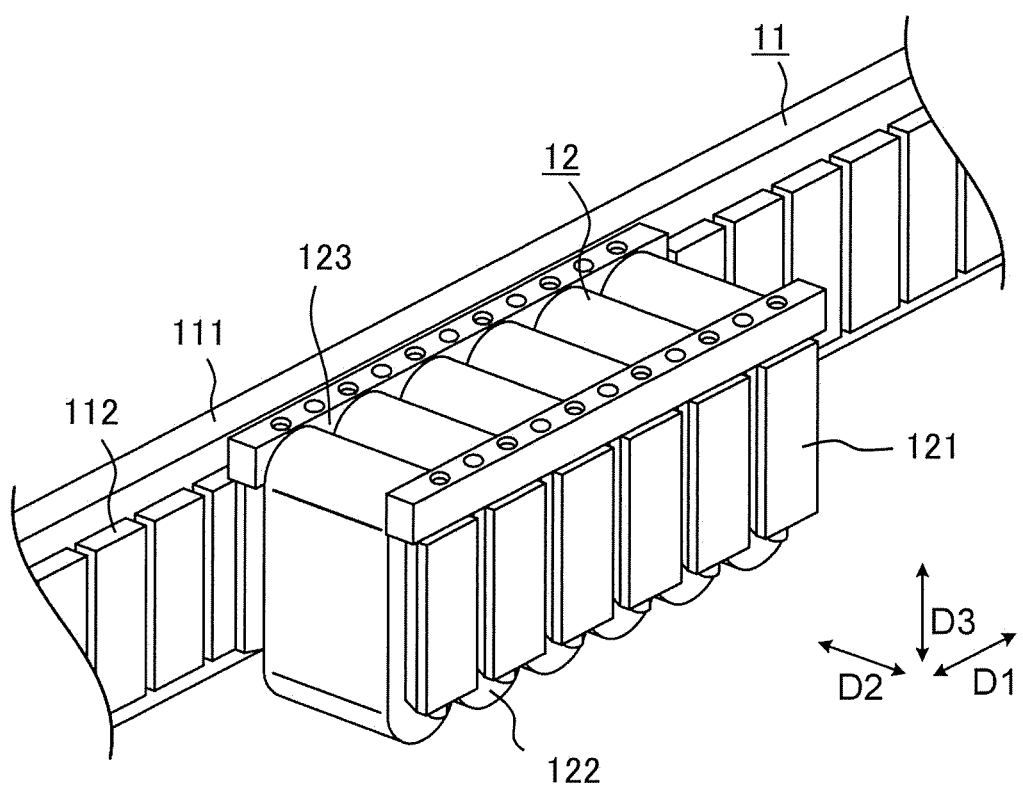
FIG. 21 is a perspective view for illustrating a portion of a field magneton and an armature of FIG. 20.

FIG. 21 is a perspective view for illustrating a portion of the field magneton 11 and the armature 12 of FIG. 20. The armature 12 is arranged between two rows of permanent magnets 112 arranged in the second direction D2. The armature 12 has armature cores 121 which are a plurality of teeth arrayed in the first direction D1, and a plurality of coils 122 wound around the respective armature cores 121. Between each adjacent pair of the armature cores 121, a slot 123 is formed.

The armature cores 121 are formed by laminating a plurality of core members formed into a plate shape. The core members forming the armature cores 121 are laminated in the third direction D3. Both sides facing the second direction D2 of the armature cores 121 are opposed to the permanent magnets 112. Between the armature cores 121 and the permanent magnets 112, a gap is formed. Surfaces of the armature cores 121 that are opposed to the permanent magnets 112 are referred to as "gap surfaces".

The coils 122 are wound around middle portions of the armature cores 121 in the second direction D2. The coils 122 are wound around the armature cores 121 via an insulator (not shown). A method of winding the coils 122 around the plurality of armature cores 121 arrayed in the first direction is similar to those in the first embodiment to the fourth embodiment.

Features of the linear electric motor 1E include a high frequency of use for reciprocating motion, and the armature 12 having both end portions in the first direction D1. When the linear electric motor 1E is used for semiconductor assembly equipment, a restriction on torque ripple is severe. Therefore, linear electric motors in the related art can not be used as a device configured to perform the reciprocating motion. However, in the linear electric motor 1E according to the fourth embodiment, torque ripple is reduced. As a result, the linear electric motor 1E can be used as a device configured to perform the reciprocating motion. Further, parts can be set on the both end portions of the armature 12 in the first direction D1. As a result, an assembly speed can be increased twofold.

Figure 22:
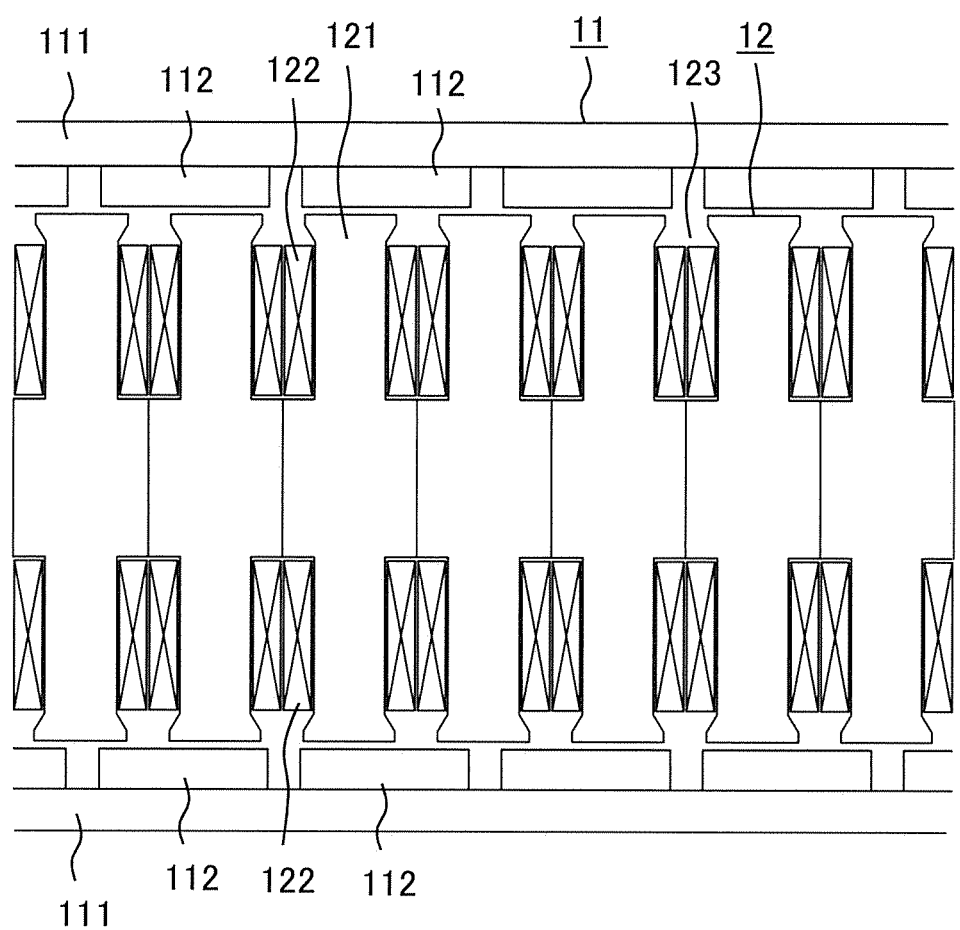
FIG. 22 is a plan view for illustrating the field magneton and the armature of FIG. 20.

FIG. 22 is a plan view for illustrating the field magneton 11 and the armature 12 of FIG. 20. As compared to rotating electric machines in the first embodiment to the fourth embodiment, at the both end portions of the armature 12 in the first direction D1, an amount of magnetic fluxes of the permanent magnets 112 passing through tip ends of the armature cores 121 is reduced. Therefore, in order to further increase an induced voltage that is proportional to the amount of magnetic fluxes and the number of turns of the coils 122, it is required to increase the number of turns of the coils 122 arranged in the slots 123.

As described above, according to the linear electric motor 1E of the fourth embodiment of this invention, the armature 12 can perform the reciprocating motion.

In each of the embodiments described above, the electric motor or linear electric motor including three-phase coils has been described. However, an electric motor or linear electric motor including coils other than the three-phase coils may be employed instead.

Further, in each of the embodiments described above, as a generator-motor, the electric motor or the linear electric motor has been described. However, a power generator or linear power generator may be employed instead.

REFERENCE SIGNS LIST 1A, 1B, 1C, 1D electric motor, 1E linear electric motor, 2 frame, 3 first housing, 4 second housing, 5 stator, 6 rotor, 7 connection, 8 first bearing, 9 second bearing, 11 field magneton, 12 armature, 21 frame main body, 22 bottom plate portion, 51 stator core, 52 coil, 53 connecting wire, 61 shaft, 62 rotor core, 63 permanent magnet, 64 pulley, 111 field yoke, 112 permanent magnet, 121 armature core, 122 coil, 123 slot, 511 core back, 512 tooth, 513 slot, 513A first half-slot, 513B second half-slot, 521 coil end

The invention claimed is:

1. A generator-motor, comprising:
a core having a core back and a plurality of teeth provided side by side on the core back, and having a slot formed between each adjacent pair of the teeth;
a plurality of coils wound around respective plurality of the teeth to be provided in each of a plurality of the slots; and
one or more connecting wires configured to connect each adjacent pair of the coils,
the coils being wound in a concentrated manner,
at least one of the connecting wires being provided on an anti-connection side which is opposite to a connection side with respect to the teeth, the connection side being a side on which the coils are connected,
of the plurality of teeth, a plurality of the teeth around which the coils of the same phase are wound and which are arrayed in line forming an in-phase teeth group,
the number of teeth included in the in-phase teeth group being represented by T which is an integer of 2 or more,
each of the slots being divided into two half-slots in an array direction which is one direction of directions in which the plurality of teeth are arrayed, one of the half-slots located in front in the array direction in the slot provided adjacent to, and at the back in the array direction of, one of the teeth being defined as a first half-slot, the other of the half-slots located at the back in the array direction in the slot provided adjacent to, and in front in the array direction of, the one of the teeth being defined as a second half-slot,
when k is an integer of 1 or more, the first half-slot adjacent to a k-th tooth which is one of the teeth provided in a k-th place in the array direction is represented by A(k, 1), and the second half-slot adjacent to the k-th tooth is represented by A(k, 2),
the number of turns of the coil arranged in A(1, 1) being the same as the number of turns of the coil arranged in A(T, 2),
the number of turns of the coil arranged in A(1, 1) being different from the number of turns of the coil arranged in A(1, 2),
when one of the connecting wires configured to connect the coil wound around the k-th tooth and the coil wound around a (k+1)-th tooth is provided on the anti-connection side, the number of turns of the coil arranged in A(k, 2) being different from the number of turns of the coil arranged in A(k+1, 1),
the number of turns of the coils provided in the slot between each pair of the teeth which are included in the in-phase teeth group and which are adjacent to one another being twice the number of turns of the coil arranged in A(1, 1),
wherein, when the one of the connecting wires configured to connect the coil wound around the k-th tooth and the coil wound around the (k+1)-th tooth is provided on the connection side, the number of turns of the coil arranged in A(k, 2) is the same as the number of turns of the coil arranged in A(k+1, 1).

2. The generator-motor according to claim 1, wherein, when the one of the connecting wires configured to connect the coil wound around the k-th tooth and the coil wound around the (k+1)-th tooth is provided on the connection side, and another one of the connecting wires configured to connect the coil wound around the (k+1)-th tooth and the coil wound around a (k+2)-th tooth is provided on the anti-connection side, or when the one of the connecting wires configured to connect the coil wound around the k-th tooth and the coil wound around the (k+1)-th tooth is provided on the anti-connection side, and the another one of the connecting wires configured to connect the coil wound around the (k+1)-th tooth and the coil wound around the (k+2)-th tooth is provided on the connection side, the number of turns of the coils provided in the slot between the k-th tooth and the (k+1)-th tooth, and the number of turns of the coils provided in the slot between the (k+1)-th tooth and the (k+2)-th tooth are twice the number of turns of the coil arranged in A(1, 1).

3. The generator-motor according to claim 1, wherein every number of turns of the coils provided in the slots among the teeth which are included in the in-phase teeth group and which are adjacent to one another is twice the number of turns of the coil arranged in A(1, 1).

4. The generator-motor according to claim 1, wherein all of the connecting wires configured to connect the coils in the in-phase teeth group are provided on the anti-connection side, and
wherein the number of turns of the coil provided in the slot between every pair of all the teeth which are included in the in-phase teeth group and which are adjacent to one another is twice the number of turns of the coil arranged in A(1, 1).

5. The generator-motor according to claim 1, wherein a ratio of the number of poles to the number of slots is one of 8:9, 10:9, 7:9, 5:6, and 7:6.

6. The generator-motor according to claim 1, wherein the coil at start of winding of a plurality of the coils wound around the in-phase teeth group is first arranged in the first half-slot or the second half-slot adjacent to a 1st tooth and then wound around the 1st tooth, the 1st tooth being the tooth provided in a first place in the array direction.

7. A generator-motor manufacturing method of manufacturing the generator-motor of claim 1, the generator-motor manufacturing method comprising:
a coil arrangement step of winding the coils around respective plurality of the teeth included in the in-phase teeth group to provide the coils in each of a plurality of the slots; and
a connecting wire arrangement step of providing at least one of the connecting wires on the anti-connection side.

8. The generator-motor manufacturing method according to claim 7,
wherein the coil arrangement step includes winding each of the plurality of coils one at a time around the teeth, and
wherein the connecting wire arrangement step is performed after the coil arrangement step.

9. The generator-motor manufacturing method according to claim 7,
wherein the coil arrangement step includes winding the coils consecutively around a plurality of the teeth which form a part of the in-phase teeth group and which are adjacent to one another, and
wherein the connecting wire arrangement step includes:
a first connecting wire step of providing, in the middle of winding the coils consecutively around the plurality of the teeth, lead wires continuous to the already-wound coils as the connecting wires; and
a second connecting wire step of providing, after winding the coils consecutively around the plurality of the teeth, lead wires different from the already-wound coils as the connecting wires.

10. A generator-motor, comprising:
a core having a core back and a plurality of teeth provided side by side on the core back, and having a slot formed between each adjacent pair of the teeth;
a plurality of coils wound around respective plurality of the teeth to be provided in each of a plurality of the slots; and
one or more connecting wires configured to connect each adjacent pair of the coils,
the coils being wound in a concentrated manner,
at least one of the connecting wires being provided on an anti-connection side which is opposite to a connection side with respect to the teeth, the connection side being a side on which the coils are connected,
of the plurality of teeth, a plurality of the teeth around which the coils of the same phase are wound and which are arrayed in line forming an in-phase teeth group,
the number of teeth included in the in-phase teeth group being represented by T which is an integer of 2 or more,
each of the slots being divided into two half-slots in an array direction which is one direction of directions in which the plurality of teeth are arrayed, one of the half-slots located in front in the array direction in the slot provided adjacent to, and at the back in the array direction of, one of the teeth being defined as a first half-slot, the other of the half-slots located at the back in the array direction in the slot provided adjacent to, and in front in the array direction of, the one of the teeth being defined as a second half-slot,
when k is an integer of 1 or more, the first half-slot adjacent to a k-th tooth which is one of the teeth provided in a k-th place in the array direction is represented by A(k, 1), and the second half-slot adjacent to the k-th tooth is represented by A(k, 2),
the number of turns of the coil arranged in A(1, 1) being the same as the number of turns of the coil arranged in A(T, 2),
the number of turns of the coil arranged in A(1, 1) being different from the number of turns of the coil arranged in A(1, 2),
when one of the connecting wires configured to connect the coil wound around the k-th tooth and the coil wound around a (k+1)-th tooth is provided on the anti-connection side, the number of turns of the coil arranged in A(k, 2) being different from the number of turns of the coil arranged in A(k+1, 1),
the number of turns of the coils provided in the slot between each pair of the teeth which are included in the in-phase teeth group and which are adjacent to one another being twice the number of turns of the coil arranged in A(1, 1),
wherein, when one of the connecting wires configured to connect the coils in the in-phase teeth group of a U-phase is defined as a U-phase connecting wire, another one of the connecting wires configured to connect the coils in the in-phase teeth group of a V-phase is defined as a V-phase connecting wire, and the other one of the connecting wires configured to connect the coils in the in-phase teeth group of a W-phase is defined as a W-phase connecting wire,
one or two of the U-phase connecting wire, the V-phase connecting wire, and the W-phase connecting wire are provided on the anti-connection side, and the others are provided on the connection side.

* * * * *